April 2, 1968 R. LIEBSCHER ETAL 3,376,519

DELAY LINE FOR TRAVELING WAVE TUBES

Filed Sept. 26, 1962

United States Patent Office 3,376,519

Patented Apr. 2, 1968

3,376,519
DELAY LINE FOR TRAVELING WAVE TUBES

Roland Liebscher and Erich Mayerhofer, Munich, Germany, assignors to Siemens Aktiengesellschaft, a corporation of Germany Filed Sept. 26, 1962, Ser. No. 226,419
8 Claims. (Cl. 333—31)

The present invention relates to a delay line, especially for traveling wave tubes, with wire or strip conductor pieces which are fastened to a metal spar extending in the longitudinal direction of the delay line and form with it a helix of a cross-sectional shape flattened at least on one side.

Traveling wave amplifier tubes for high powers require a delay line which has a high heat dissipating capacity. At the same time, the delay line must have a low dispersion over a wide frequency range.

As delay line of very effective high heat capacity and heat radiating surface, there is known a line having slot resonators which are electrically and magnetically coupled with each other. The slot resonators are in this connection formed by wire or strip conductors which are wound on and fastened to metal spars.

The object of the present invention is to provide a delay line constructed in accordance with the above noted principle, which has a very flat dispersion curve over a wide frequency band.

In order to achieve this object, there is proposed a delay line of the aforementioned type in which, in accordance with the invention, a metallic spar has, between the places at which the individual conductor pieces are fastened to it, notches of such shape and depth that the metal spar together with the notches represents an inherent delay line only at frequencies which are higher than the operating frequency range, and in which at least one metal arm, extending parallel to the metal spar symmetrically surrounds the conductor pieces, at a slight distance from them, on the side of the helix facing away from the metal spar.

A delay line is already known which comprises a helix, the individual turns of which are fastened rigidly to the free ends of the teeth of a comb line. The upper critical frequency of the comb line lies thereby in the transmission band of the helix, so that the comb line acts as an inherent delay line in the operating frequency range. The energy present on the delay line is therefore transported both by the helix line and by the comb line so that only a part of the total power for the interaction with the electronic beam is available on the helix line. In the case of a delay line in accordance with the invention, on the other hand, practically the entire energy is conducted along the helix which is formed by the wire- or strip-like pieces in combination with the metal spar. The efficiency of a traveling wave tube having a delay line in accordance with the invention is therefore greater than that of a tube having the known delay line described. Furthermore, the space required by the known delay line described, due to the relatively great length of the individual teeth of the comb line, is greater than in the case of the line in accordance with the invention.

The invention will now be explained in further detail with reference to the schematic showing in the drawings.

Figure 1:
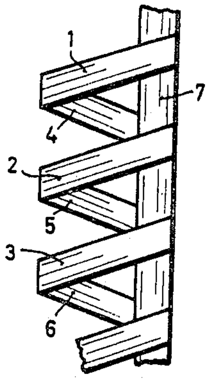
FIG. 1 shows the simplest form of a delay line constructed in known manner of slot resonators.
Figure 2:
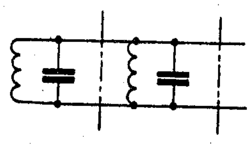
FIG. 2 represents a substitution circuit for the line shown in FIG. 1.

For reasons of economy of space, only one metal spar 7 is provided in FIG. 1, to which are fastened the metal strips 1 to 6 which form the slot resonators. On the side of the delay line facing away from the metal spar 7, the superimposed metal strips 1 and 3, 2 and 4 and 3 and 6, are connected respectively with each other. The length of the slot resonators limited by the individual metal strips should correspond in this connection to about ¼ of the average operating wave length. The slot resonators are magnetically coupled with each other on the side where the resonators are terminated by the metal spar 7, and electrically connected with each other on the side where the resonators are open. As noted before, FIG. 2 shows the substitution or equivalent circuit of this line.

The band width of the line shown in FIG. 1 depends on the amount of electrical magnetic coupling of the individual resonators.

The magnetic coupling and thus the band width is improved in accordance with the invention by the provision of notches formed in the metal spar 7 between the places where the individual metal strips are fastened. These notches may have any desired shape. However, the notches must be so dimensioned that they do not, within the operating frequency range, form resonators by themselves nor a delay line in combination with the metal spar. In order that the notches contribute in the desired manner to increasing the magnetic coupling, that is, that they act as inductive load, the metal spar with the notches must act as a delay line only in a frequency range which is higher than the operating frequency range.

In order further to increase the band width by improving the electric coupling, in accordance with the invention, in the case of a delay line such as shown in FIG. 1, there are provided within the region of the electric stray field of the line two metallic longitudinal bars parallel to the metal spar 7 which capacitively load the delay line. The metal bars can in this connection advantageously be electrically connected with the metal spars.

Figure 3:
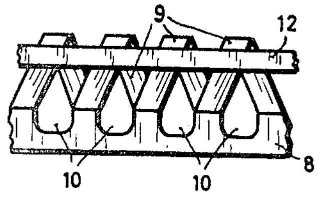
FIGS. 3 and 4 illustrate respectively in side view and in end view a delay line according to the invention.
Figure 4:
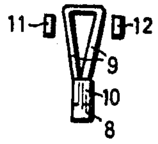

One embodiment of a delay line in accordance with the invention containing the measures described is shown in side view in FIG. 3 and in front view in FIG. 4. To the metal spar 8 which extends in the longitudinal direction of the delay line, there are fastened strip-shaped conductor pieces 9 which, together with the metal spar 8, form a helix which has a triangular cross-section. The metal spar 8 is provided with notches 10 between the places to which the individual metal strips 9 are fastened. The notches have the shape of substantially circular arcs and should have a depth such that the inductive coupling of the conductor pieces 9 via the metal spar 8 is increased. This result is always obtained when the metal spar 8, with the notches 10, represents an inherent delay line only for frequencies which are higher than the operating frequency range. On the side facing away from the metal spar 8, two metallic longitudinal bars 11 and 12, extending parallel to the metal spar 8, symmetrically surround the conductor pieces 9, spaced a small distance therefrom. The longitudinal bars 11 and 12 effect a capacitive loading of the line in the region of the coupling of the individual resonators formed between the conductor pieces 9, whereby the shape of the dispersion curve is flattened, and the band width which can be employed is increased. The capacitive loading of the line is in this case effected outside the zone of the greatest stray field of the delay line since this zone remains reserved for the localized attenuation in order to prevent self-excitation.

The delay line shown in FIGS. 3 and 4 is preferably operated with an electron beam which is guided between the metal spar 8 and one of the longitudinal arms 11 or 12 laterally along the delay line. The electron beam is in this connection advantageously developed as a flat beam.

Figure 5:
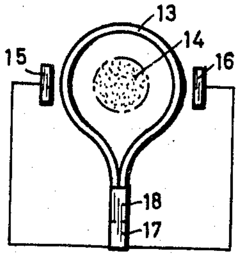
FIG. 5 is a front view of a delay line comprising features according to the invention.

However, it is also possible to develop the delay line of the invention in such a manner that the electron beam is guided wtihin the helix which is formed by the individual strip or wire-shaped conductor pieces and the metal spar serving for the fastening of said conductor pieces. For this purpose, this helix is widened in cross-section. FIG. 5 shows such a delay line from the front, in which connection the conductor pieces 13 are so shaped that the helix has an onion-like cross-section. Numeral 14 indicates the cross-section of the electron beam which is guided within this helix. The metallic longitudinal bars 15 and 16 serve again for the capacitive loading of the delay line and are electrically connected with the metal spar 17 which is again provided with notches 18.

Figure 6:
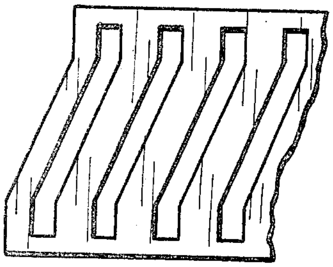
FIG. 6 shows in elevational view part of a metal strip for making a delay line such as indicated in FIGS. 3, 4 and 5.
Figure 7:
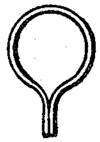
FIG. 7 shows the strip of FIG. 6 bent upon itself and soldered together to secure the desired configuration.

A delay line in accordance with FIGS. 3 and 4 or 5 may be produced in simple manner by punching the metal spar and the longitudinal bars out of a single strip of sheet metal and then bending around a correspondingly shaped mandrel. FIG. 6 shows such a strip 19 of sheet metal which is for instance bent together and soldered in the manner shown in FIG. 7.

The invention is not limited to the embodiments shown by way of example. In particular, the notches in the metal spar can be developed in the form of short slits.

The important advantage of a delay line in accordance with the invention resides in the large band width and the high heat capacitance and heat dissipation, with a very compact and space saving construction.

Changes may be made within the scope and spirit of the appended claims which define what is believed to be new and desired to have protected by Letters Patent.

We claim:

1. A delay line, particularly for traveling wave tubes with wire- or strip-shaped conductor pieces which are fastened to a metal spar extending in the longitudinal direction of the delay line and forming with it a helix having a cross-section which is flattened on at least one side, said metal spar having, intermediate the points at which the individual conductor pieces are fastened thereto, notches formed therein which are of such shape and depth that the metal spar with the notches represents an inherent delay line only at frequencies which are higher than the operating frequency range, and wherein at least one metal bar, extending parallel to the metal spar, is symmetrically disposed with respect to the conductor pieces a short distance therefrom on the side of the helix facing away from the metal spar.

2. A delay line according to claim 1, wherein the notches have the shape of circular arcs.

3. A delay line according to claim 2, wherein the conductor pieces are so shaped that the helix is of triangular cross-section.

4. A delay line according to claim 2, wherein the conductor pieces are so shaped that the helix is onion-shaped in cross-section.

5. A delay line according to claim 2, wherein the helix is cross-sectionally triangularly-shaped, and wherein the conductor pieces and the metal spar which are provided with notches, are formed by a punched part which is bent together.

6. A delay line according to claim 2, wherein the metal bars are connected in electrically conductive manner with the metal spar.

7. A delay line according to claim 1, wherein the notches have a rectangular configuration.

8. A delay line according to claim 2, wherein the helix is cross-sectionally onion-shaped, and wherein the conductor pieces and the notched metal spar are integrally formed from a single punched part bent to said cross-sectional configuration.

References Cited

UNITED STATES PATENTS

| | | | |
|---|---|---|---|
| 2,983,839 | 5/1961 | Field | 333—31 |
| 2,999,182 | 9/1961 | Field | 333—31 |
| 3,020,498 | 2/1962 | Ash | 333—31 |
| 3,201,720 | 8/1965 | Bradford | 333—31 |

HERMAN KARL SAALBACH, *Primary Examiner.*

C. BARAFF, *Assistant Examiner.*